US012141461B2

(12) United States Patent
Cruz-Aguilar et al.

(10) Patent No.: US 12,141,461 B2
(45) Date of Patent: Nov. 12, 2024

(54) INTEGRATING MIRRORED STORAGE TO REMOTE REPLICATION SITE

(71) Applicant: INTERNATIONAL BUSINESS MACHINES CORPORATION, Armonk, NY (US)

(72) Inventors: Esdras E. Cruz-Aguilar, Round Rock, TX (US); Taru Varshney, Gopanpally (IN); Jes Kiran Chittigala, Hyderabad (IN); Ravi A. Shankar, Austin, TX (US); Perinkulam I Ganesh, Round Rock, TX (US); Michael S Fuller, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/822,181

(22) Filed: Aug. 25, 2022

(65) Prior Publication Data

US 2024/0069778 A1 Feb. 29, 2024

(51) Int. Cl.
*G06F 3/06* (2006.01)
(52) U.S. Cl.
CPC ............ *G06F 3/065* (2013.01); *G06F 3/0604* (2013.01); *G06F 3/0679* (2013.01)
(58) Field of Classification Search
USPC .......... 711/162, 161; 714/6.3, 4.11 E, 11.106
See application file for complete search history.

(56) References Cited

U.S. PATENT DOCUMENTS

| 6,732,294 | B2 | 5/2004 | Mackrory et al. |
| 7,168,088 | B1* | 1/2007 | Matena ............... G06F 11/2033 709/219 |
| 7,257,689 | B1 | 8/2007 | Baird |
| 7,689,862 | B1* | 3/2010 | Bharthulwar ....... G06F 11/2025 714/13 |
| 8,161,142 | B2 | 4/2012 | Bashir et al. |

(Continued)

FOREIGN PATENT DOCUMENTS

WO 2024/042396 A1 2/2024

OTHER PUBLICATIONS

IBM, "Controller System (KSYS)", in IBM Geographically Dispersed Resiliency for Power Systems / 1.2.0, published online with last updates Mar. 5, 2021, downloaded from the internet Jul. 1, 2022 from https://www.ibm.com/docs/en/gdr-power/1.2.0?topic=concepts-ksys, 4 pages.

(Continued)

*Primary Examiner* — Yaima Rigol
*Assistant Examiner* — Elias Young Kim
(74) *Attorney, Agent, or Firm* — Caleb D. Wilkes

(57) ABSTRACT

A method, computer system, and computer program product area provided. A computer transmits a query command to a storage descriptor area of a first disk. The first disk belongs to a dual-site data replication system. The dual-site data replication system provides active-active access to a volume of data stored in an active disk and replicated in a backup disk. The computer receives a response to the query command. The response indicates the active disk and the backup disk for the dual-site data replication system. The computer controls an additional copy of the volume of data at a further remote site based on the active disk.

20 Claims, 6 Drawing Sheets

(56) References Cited

U.S. PATENT DOCUMENTS

| | | | | |
|---|---|---|---|---|
| 8,498,967 | B1* | 7/2013 | Chatterjee | G06F 11/2069 707/674 |
| 9,081,842 | B1 | 7/2015 | Natanzon | |
| 9,811,272 | B1* | 11/2017 | Lecrone | G06F 11/2069 |
| 10,146,453 | B2 | 12/2018 | Blea et al. | |
| 10,691,568 | B2 | 6/2020 | Avraham et al. | |
| 10,915,406 | B2 | 2/2021 | Blea et al. | |
| 10,936,545 | B1* | 3/2021 | Chockalingam | G06F 11/1448 |
| 2008/0065760 | A1* | 3/2008 | Damm | H04L 43/022 709/224 |
| 2008/0115008 | A1* | 5/2008 | Daftardar | G06F 11/2092 714/3 |
| 2011/0161723 | A1 | 6/2011 | Taleck et al. | |
| 2014/0019802 | A1 | 1/2014 | Rooney et al. | |
| 2014/0258659 | A1* | 9/2014 | Petersen | G06F 3/0622 711/162 |
| 2016/0196322 | A1* | 7/2016 | Xu | G06F 16/24539 707/611 |
| 2017/0300233 | A1 | 10/2017 | Sato | |
| 2019/0026352 | A1* | 1/2019 | Marathe | G06F 16/907 |
| 2022/0121534 | A1* | 4/2022 | Sontakke | G06F 11/2025 |

OTHER PUBLICATIONS

IBM Redbooks, "IBM Geographically Dispersed Resiliency Power Systems"—Abstract of a published book, last updates for publication Nov. 13, 2017, downloaded from Internet Aug. 23, 2022 from https://www.redbooks.ibm.com/Redbooks.nsf/RedpieceAbstracts/sg248382.html, 4 pages.

Mell et al., "The NIST Definition of Cloud Computing", National Institute of Standards and Technology, Special Publication 800-145, Sep. 2011, pp. 1-7.

International Searching Authority, "International Search Report and Written Opinion of the International Searching Authority", International Application No. PCT/IB2023/057561, Mailed Dec. 22, 2023, 16 pages.

Cruz-Aguilar et al., "Integrating Mirrored Storage to Remote Replication Site", International Application No. PCT/IB2023/057561, International Filing Date Jul. 26, 2023, 41 pages, claims priority on U.S. Appl. No. 17/822,181 (present application).

International Searching Authority, "Invitation To Pay Additional Fees, Partial International Search, and Provisional Opinion Accompanying The Partial Search Result", International Application No. PCT/IB2023/057561, Mailed Oct. 31, 2023, 13 pages.

* cited by examiner

300

| SCSI DSO Host Write Command | | | | | | | | |
|---|---|---|---|---|---|---|---|---|
| Byte | Bit 7 | Bit 6 | Bit 5 | Bit 4 | Bit 3 | Bit 2 | Bit 1 | Bit 0 |
| 0 | SCSI Op Code = 0xED | | | | | | | |
| 2 | Reserved | | | | | | | |
| 2 | Flags (see suborder command details) | | | | | | | |
| 3-10 | Reserved | | | | | | | |
| 11 | Active-Active storage local/remote | | | | | | | |
| 12-13 | Transfer Length | | | | | | | |
| 14 | Suborder Command: 0x60 - Establish PPRC Paths 0x61 - Remove PPRC Paths 0x62 - Establish PPRC Pair 0x63 - Suspend PPRC Pair 0x64 - Terminate PPRC Pair 0x66 - Freeze PPRC Group 0x67 - Store Active-Active configuration | | | | | | | |
| 15 | 0 | | Reserved | | | NACA | | 0 |

FIG. 3

INTEGRATING MIRRORED STORAGE TO REMOTE REPLICATION SITE

BACKGROUND

The present invention relates generally to data storage for disaster recovery and to integrating different types of data storage for multiple replication sites.

SUMMARY

According to one exemplary embodiment, a computer-implemented method is provided. A computer transmits a query command to a storage descriptor area of a first disk. The first disk belongs to a dual-site data replication system. The dual-site data replication system provides active-active access to a volume of data stored in an active disk and replicated in a backup disk. The computer receives a response to the query command. The response indicates the active disk and the backup disk for the dual-site data replication system. The computer controls an additional copy of the volume of data at a further remote site based on the active disk.

A computer system and a computer program product corresponding to the above-described method are also provided

BRIEF DESCRIPTION OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 3 is a diagram illustrating a storage description area for the replication integration according to at least one embodiment;

DETAILED DESCRIPTION

Figure 1:
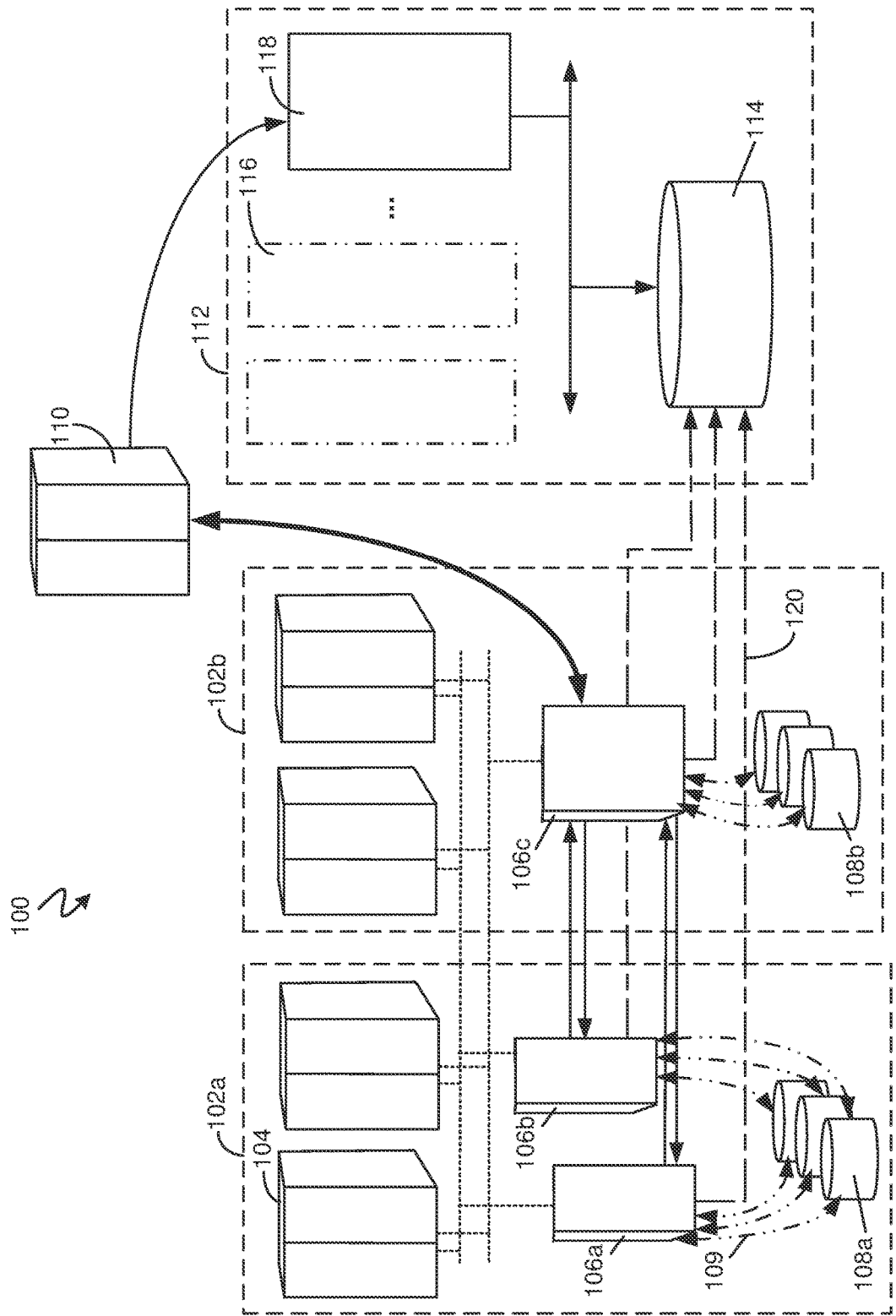
FIG. 1 is a block diagram illustrating the replication system architecture in accordance with at least one embodiment.

Detailed embodiments of the claimed structures and methods are disclosed herein; however, it can be understood that the disclosed embodiments are merely illustrative of the claimed structures and methods that may be embodied in various forms. This invention may be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

In data mirroring systems, data may be stored in volume pairs that include a primary volume associated with a primary memory storage and a corresponding secondary volume associated with a secondary memory storage. The primary and secondary memory storage may be disposed at different sites in order to provide backup protection if a problem happens at the first site. For example, a hurricane, earthquake, or other natural disaster could lead to a power outage which could cause the first site to be unavailable for an extended length of time, and lead to the need to access the secondary volume. For an active-active memory storage architecture, the two sites both can service an application/workload at any time, so each site and volume functions as an active application site allowing access. The secondary volume may be a copy of the data maintained in the primary volume. The primary and secondary volumes are identified by a copy relationship in which the data of the primary volume, also refereed to as the source volume, is copied to the secondary volume, also referred to as the target volume. Primary and secondary storage controllers may be used to control access to the primary and secondary memory storage. The secondary site may be disposed at any distance from the primary site. If the secondary site is located less than 100 km away, an advantage may be presented to the user where backup can be accessed more quickly, because data must still flow across physical links and a shorter physical distance will lead to more rapid responses. These storage systems allow input/output operations to be swapped from a first set of disks to a second set of disks to store operations data. The first set of disks may be for a primary volume and another set of disks for the secondary volume.

Computers, in some instances referred to herein as controllers, may be configured to allow management of planned and unplanned outages of the memory storage. The controllers are configured to detect failures at the primary storage subsystem which may be at a local site. Such failures may include a problem writing to or accessing primary storage volumes at the local site, or other problems as discussed herein. When such failures are detected by the controller(s), e.g., by the operating system, the controller(s) can invoke or cause to be invoked a storage unit swapping function, an example of which is the IBM® HyperSwap® function. (IBM, HyperSwap, and all IBM—based trademarks and logos are trademarks or registered trademarks of International Business Machines Corporation and/or its affiliates). This swapping function may be used to automatically swap the processing for all data volumes in the mirrored configuration from the primary site to the secondary site. The swapping may include a peer-to-peer remote copy failover. The application/workload inputs/outputs may be transparently redirected to the secondary storage subsystem, thereby allowing the application/workload to continue running as a part of high-availability.

As a consequence of the swap, the storage volumes at the secondary site which were originally configured as the secondary volumes of the original copy relationship, are reconfigured as the primary volumes of a new copy relationship. Similarly, once the volumes at the local site are operational again, the storage volumes at the first site which were originally configured as the primary volumes of the original copy relationship may be reconfigured as the secondary volumes of the new copy relationship. In anticipation of an unplanned swap, information may be passed b the controllers so that one or more swapping controllers can automatically detect a failure on its/their own and invoke a swap upon the failure detection, in various situations, the swap may include switching input/output (I/O) operations for a workload and directed to one or more volumes of a data storage to corresponding copies of the volume to a secondary source storage without impacting the I/O production work. This swap may be a peer-to-peer remote copy failover. One or more nodes e.g., virtual machines, that are performing the workload have before not known which of the two data volumes is operating as the primary copy; instead the node(s) merely knew that their workload was being supported. The application I/Os are redirected to the secondary storage subsystem, thereby allowing the applications to continue running.

Such active-active sites may support more than one input/output group. Data that is written to the volume may be automatically sent to the copies at both sites. If one site is no longer available, the other site can provide access to the volume. Active-active relationships may be made between the copies at each site. The data flow automatically runs and switches direction according to which copy or copies are online, up to date, and available. The relationships help clarify which copy should be provided to a workload/application. The copy may be selected that is up to date through a single volume. The single volume may have a unique ID. Relationships may be grouped into consistency groups similar to those consistency groups used for synchronous and asynchronous mirrored relationships. The consistency groups fail over consistently as a group based on the state of all copies in the group. An image that can be used for disaster recovery is maintained at each site.

When the system topology is set to such an active-active configuration, each node, controller, and host in the system configuration may have a site attribute set to 1 or 2. Both node canisters of an input/output group may be at the same site. This site may be the same site as the controllers that provide the managed disks to that input/output group. When managed disks are added to storage pools, their site attributes may match. This matching ensures that each copy in an active-active relationship is fully independent and is at a distinct site.

The Small Computer System Interface (SCSI) protocol allows storage devices to indicate the preferred ports for hosts to use when they submit input/output requests. Using the Asymmetric Logical Unit Access (ALUA) state for a volume, a storage controller can inform a host which paths are active and which paths are preferred. The system may suggest that the host use "local" nodes over remote nodes. A "local" node is a node that is configured at the same site as the host.

An active-active relationship may be used to manage the synchronous replication of volume data between two sites. The master volume may be made accessible through either input/output group. The synchronizing process starts after change volumes are added to the active-active relationship.

In other storage systems sometimes referred to as disaster recovery systems, a greater physical distance between a main data volume memory storage and a secondary memory storage which hosts a backup for the main data volume is desired. The main and secondary memory storage may include disks referred to as production disks and backup disks, respectively. The greater physical distance may be useful in instances when a large event disrupts memory storage function and accessibility, e.g., in the event of a fire, earthquake, vandalism, power outage, or other catastrophic event. With a greater physical distance, e.g., a distance of larger than 100 km, the chances are reduced that a first disruptive large event will harm both the primary and secondary memory storage. Such memory storages for such geographically dispersed disaster recovery often will be implemented with a one-to-one mapping for the data of the volume. Such a disaster recovery solution may be deemed an active-passive data architecture and typically does not provide robustly high availability as is provided by an active-active system. This reduced level of robustness is acceptable because the disaster recovery backup will be needed less often.

The following described exemplary embodiments provide a method for integrating such different data replication systems for improving data availability and disaster recovery. The present embodiments integrate the one-to-one mapped active-passive memory storage systems with the swappable active-active mirrored memory storage system. Such integration has previously been a challenge due to (1) the active disks that are used by a virtual machine in the active-active mirrored memory systems changing on the fly without user intervention and (2) the further remote memory storage for disaster recovery including a number of disks that matches the number of disks at one of the two sites of the active-active mirrored storage and not having enough disks to match the total number of disks from both sites of the active-active mirrored storage. The present embodiments include using and setting of storage level descriptor bits and/or the storage level descriptor area to save operating system specific information that may be retrieved and used by a controller to handle disaster recovery and to organize creation of and/or updating of the further remote copy in a way that allows the further remote copy to be maintained up-to-date despite the active-active mirrored copy pair changing its active-active relationship on the fly. The present embodiments thereby achieve improvement of memory storage for supporting high availability data storage that is used by critical workloads for which downtime is highly disruptive for an organization.

FIG. 1 shows an enhanced replication system architecture 100 in accordance with at least one embodiment. FIG. 1 in the left part of the screen shows the active-active data replication system that includes a first site 102a and a second site 102b. These two sites 102a, 102b may allow for local data replication and the above-described active-active volume copy relationship. These two sites may be considered local with respect to each other due to, for example, a distance between them of 100 km or less. The first site 102a includes multiple virtual machines configured to operate/run a workload/application. A first virtual machine 104 is labeled at the first site 102a. Active-active data storage to support the workload of the first virtual machine 104 is provided via disks at the first site 102a and at the second site 102b. A first disk controller 106a and a second disk controller 106b are disposed at the first site 102a to control the first site disks 108a that are also disposed at the first site 102a. Data may be stored on the first site disks 108a. A third disk controller 106c is disposed at the second site 102b to control the second site disks 108b that are also disposed at the second site 102b. Data may be stored on the second site disks 108b. The various disk controllers may send a control transmission such as the first control transmission 109 to one or more of these disks in order to save data and to update saved data.

A first volume of data to support a workload for the first virtual machine 104 in some embodiments is stored in the first site disks 108a. A copy of that volume of data is in some embodiments stored in the second site disks 108b. Data that is generated via the workload being performed by the first virtual machine 104 may be automatically sent to be stored as a first volume copy at the first site disks 108a and as a second volume copy at the second site disks 108b. If either the first site disks 108a or the second site disks 108b become unavailable, the other of these two sites may make the data/volume available to the workload/application of the first virtual machine 104. An active-active relationships may be made between the copies so that the data flow automatically runs and switches direction according to which copy or copies are online and up to date. If the first site storage fails, the system may continue to support operations for the first virtual machine 104 by transferring operations to the storage of the second site 102b, e.g., to the third disk controller 106c and to the second site disks 108b. The virtual machine is unaware of which storage is providing support for its operation and is unaware of the transfer of the designation of main storage from the first site 102a to the second site 102b but from the perspective of the first virtual machine 104, the system continues operation.

The first site 102a and the second site 102b and their internal components may communicate with each other and exchange data via a communication network. The communication network allowing communication between the HyperSwap sites may include various types of communication networks, such as the Internet, a wide area network (WAN), a local area network (LAN), a telecommunication network, a wireless network, a public switched telephone network (PTSN) and/or a satellite network. The communication network may include connections such as wire, wireless communication links, and/or fiber optic cables.

The right side of FIG. 1 shows a further remote replication site 112 which is disposed a long distance and geographically dispersed from the first site 102a and from the second site 102b. The further remote replication site 112 can host a further copy of a data volume that is firstly being stored at the first site 102a and/or at the second site 102b. The further remote replication site 112 includes disaster recovery disks 114 which may store the further copy of the data volume. A remote site controller 110 controls the operations of the further remote replication site 112 and facilitates integration with the active-active data replication system that includes the first site 102a and the second site 102b. The further remote replication site 112 may be disposed at a second distance from the first site 102a which is greater than the first distance between the first site 102a and the second site 102b. For example, the first site 102a and the second site 102b may be in the same region or metro area while the further remote replication site 112 may be disposed in an entirely different region of the country. For example, the further remote replication site 112 may be in the Chicago metro area while the first site 102a and the second site 102b may both be in the Austin metro area in Texas.

Building a data replication system which includes both data replication backup at the second site 102b and data replication backup at the further remote replication site 112 allows diversification of and enhanced data recovery when primary system failure occurs. Such primary system failure may occur for a variety of reasons. Integrating the data replication backup at the further remote replication site 112 with the active-active replication between the first site 102a and the second site 102b is achieved in the present embodiments and overcomes the challenge that the virtual machine at the further remote replication site 112 can have a disk that is a copy of only either a disk for the primary storage at the first site 102a or a disk for the secondary storage at the second site 102b, depending on which of the two sites currently has its disk(s) designated as a lead disk for the active-active backup.

The disaster recovery disks 114 may store the further copy of the data volume and be set up to actively mirror the first copy in the first site disks 108a or the second copy in the second site disks 108b but not both. The storage here at the further remote replication site 112 may be referred to as active-passive storage, because this data will not be relied on unless the primary system(s) fail and virtual machines at the further remote replication site 112 are activated with the volume copy at the disaster recovery disks 114 supporting the newly-started remote virtual machine. The present embodiments help the further remote replication site 112 know which of the first two copies to actively mirror. Together the first site disks 108a and the second site disks 108b saving data for the volume copy may be double the number of the disaster recovery disks 114 saving data for the volume copy.

The further remote replication site 112 may include one or more on-demand virtual machines 116 which are activated as needed. Such activation may occur if the first site 102a and the second site 102b fail so that support for operating the workload of the first virtual machine 104 may pass over to the further remote replication site 112 and the volume copy in the disaster recovery disks 114. In this type of failover, the on-demand virtual machine 116 may be activated to support the workload/operation and for better integration with the data copy being used from the disaster recovery disks 114. Due to this non-activation during normal operation of the first site 102a and/or the second site 102b, the data replication here at the further remote replication site 112 may be deemed active-passive replication. If the first site 102a and the second site 102b fail, then the activation of such on-demand virtual machine 116 may be needed to continue the operation of the workload/application. The further remote replication site 112 may also include a virtual input/output server 118 which facilitates the sharing of physical input/output resources between client logical partitions within the server.

The virtual input/output server 118 may receive information from a remote site controller 110 for starting and updating the additional volume copy of the data in the disaster recovery disks 114. The remote site controller 110 may be a server, e.g., a computer, which communicates between (1) the active-active region, namely the region that includes the first site 102a and the second site 102b and (2) the active-passive region of the further remote replication site 112. The remote site controller 110 may provide a single point of control for the entire environment managed by the disaster recovery solution which includes the active-passive replication. To succeed the remote site controller 110 cannot be affected by errors that can cause an outage in the production systems. Therefore, the remote site controller 110 must be self-contained and share a minimum number of resources with the production system. For example, the remote site controller 110 may be deployed in an alternative site from the first site 102a and the second site 102b so that the remote site controller 110 is isolated from any issues or failure in the active sites (the first site 102a and/or the second site 102b). In some embodiments, the remote site controller 110 may have an out-of-band deployment in its own logical partition that runs on an operating system.

The remote site controller 110 is responsible for recovery actions if a disaster or a potential disaster occurs that disables the first site 102a and the second site 102b. Therefore, the availability of the remote site controller 110 is a fundamental requirement of the solution. The remote site controller 110 is deployed in an alternative site and must remain operational even if the active site fails or if the disks located in the active site fail. The remote site controller 110 may constantly monitor the production environment for any unplanned outage that affects the production site or the disk subsystems. If an unplanned outage occurs, the remote site controller 110 may analyze the situation to determine the status of the production environment. When a site fails, the remote site controller 110 may in some embodiments notify an administrator about the failure. If the failure is severe, the administrator can initiate a site takeover. Alternatively, the remote site controller 110 may itself initiate failover to the further remote replication site 112 if the remote site controller 110 senses failure of the primary site. The remote site controller 110 may pause the processing of the data replication to ensure secondary data consistency and to process the site takeover.

The remote site controller 110 may handle discovery, verification, monitoring, notification, and recovery operations to support disaster recovery for the solution invoking use of the further remote replication site 112. The remote site controller 110 may interact with a hardware management console to collect configuration information of the managed systems. The remote site controller 110 may interact with the first disk controller 106a, the second disk controller 106b, the third disk controller 106c, and/or the virtual input/output server 118, and may do so through the hardware management console, to obtain storage configuration information of the virtual machines. The remote site controller 110 provides storage replication management and may also provide management of computing/storage capacity that is needed on demand.

The remote site controller 110 may run in an operating system logical partition. The operating system logical partition may include customized security as per operating system requirements for a respective organization. Management of the remote site controller 110 may in some embodiments be enabled only for the root user in the operating system logical partition. The remote site controller 110 may in some embodiments be restricted so as not to communicate with any external systems except for the hardware management console. The remote site controller 110 may use one or more application programming interfaces ("APIs") to communicate with the hardware management console. These application programming interfaces may include those that conform to the design principles of representational state transfer architectural style, e.g., those which require enablement of HTTPS in the enhanced replication system architecture 100.

Integrating the data replication backup at the further remote replication site 112 with the active-active replication between the first site 102a and the second site 102b is achieved in the present embodiments and overcomes the challenge that the virtual machine at the further remote replication site 112 can have a disk that is a copy of only either a disk for the primary storage at the first site 102a or a disk for the secondary storage at the second site 102b, depending on which of the lead disks for the two sites currently is designated as a lead disk for the active-active backup. In the present embodiments, storage level descriptor bits and/or the storage level descriptor area in the disks of the active-active system are used to store the active-active configuration information. This information may be retrieved and used to then choose the correct disk for the further remote replication site 112 to copy as an additional copy of the volume data for supporting the workload/application. The correct disk may be part of the consistency group and replicated for storage at the further remote replication site 112 for use in case of disaster. The active-active configuration information in the storage level descriptor bits and/or area may include an indication of the active-active feature being enabled and which disk in the active-active pair is currently configured as the lead disk. The remote site controller 110 may retrieve this information and manage control, e.g., the creation and updating, of the additional copy at the further remote replication site 112 on the basis of the retrieved information. The additional copy is created and/or updated to match the copy in the lead disk of the active-active pairing, i.e., either the first site disks 108a or the second site disks 108b. The remote site controller 110 controls the further remote copy by creating the further remote copy and by updating the further remote copy to correspond to changes, additions, deletions, and/or other updates in the designated lead disk. The remote site controller 110 may access the data of the determined active disk to send to the further remote replication site 112 for controlling the additional copy of the data that is stored at the further remote replication site 112.

The remote site controller 110 may retrieve the active-active information in an out of band communication with the first site 102a and/or the second site 102b, and, particularly, with the first disk controller 106a, the second disk controller 106b, and/or the third disk controller 106c. The information is then, via the respective disk controller, retrieved from the respective storage level descriptor area in the first site disks 108a and/or in the second site disks 108b, as appropriate. When the active/lead disk changes on the fly, e.g., is changed from the first site disks 108a to the second site disks 108b, a kernel extension for the active-active system may update the information in the storage level descriptor bit for that disk. The remote site controller 110 may recognize the update and correspondingly modify the copying/updating of the additional copy at the further remote replication site 112 in the disaster recovery disks 114. Thus, in the above example where the first site disks 108a are the active/lead disks for the active-active configuration and subsequently a change occurs in that the second site disks 108b become the active/lead disks for the active-active configuration, the additional copy in the disaster recovery disks will begin to receive updates based on changes in the second site disks 108b instead of based on changes in the first site disks 108a. The remote site controller 110 retrieving the active-active information is an example of the active-active details being dynamically queried and leveraged outside the virtual machine, e.g., outside the first virtual machine 104. Whereas in prior active-active configurations an operating system of the virtual machine being supported did not know which of the two disks was the lead disk and which was the backup, the relationship information and the configuration information are now exposed to the remote site controller 110. An out of band communication as referred to herein may refer to a communication that does not accompany a regular data transfer and/or is not part of a regular data transfer. A dscli command communication is an example of such an out of band communication.

FIG. 1 shows connections between the first, second, and third disk controllers 106a, 106b, and 106c, respectively, and the disaster recovery disks 114 for transmitting volume data for creating and/or updating the additional volume copy at the further remote replication site 112. These connections may occur via a communication network such as the Internet, a wide area network (WAN), a local area network (LAN), a telecommunication network, a wireless network, a public switched telephone network (PTSN) and/or a satellite network. The communication network may include connections such as wire, wireless communication links, and/or fiber optic cables. Of these connections, FIG. 1 labels a first remote storage transmission 120 between the first disk controller 106a and the disaster recovery disks 114.

The remote site controller 110 may retrieve the active-active information in an out of band communication with the first site 102a and/or the second site 102b, and, particularly, with the first disk controller 106a, the second disk controller 106b, and/or the third disk controller 106c. FIG. 1 includes an arrow between the remote site controller 110 and the third disk controller 106c to show an example of such out of band communication for retrieving the active-active enablement and configuration information from the disks, in this case from the storage descriptor area of the second site disks 108b. Although arrows are for simplicity purposes in the drawings not shown between the remote site controller 110 and the first disk controller 106a and between the remote site controller 110 and the second disk controller 106b, the remote site controller 110 carries out such out of band communications with the first disk controller 106a and/or with the second disk controller 106b in at least some embodiments.

With the close integration of the operating system and storage technology, software having rights to perform out of band communication with the particular memory storage can identify that active-active swappable data replication is configured in this system. In case the active-active setting is enabled and the production site virtual machine fails, applications can continue after restart of the virtual machine(s) on the remote site. This restart support overcomes the status quo that failures of the production site were fatal even when the remote site had enough capacity and support. The present embodiments require only half of the production site disks to make all the applications/system functional again. Consistency group membership will be automatically adjusted on the fly based on the dynamic behavior of the active disks used by the respective virtual machine.

It should be appreciated that FIG. 1 provides an illustration of one implementation and does not imply any limitations with regard to other embodiments in which the replication integration system and method may be implemented. Many modifications to the depicted environments, structures, and components may be made based on design and implementation requirements.

Figure 2:
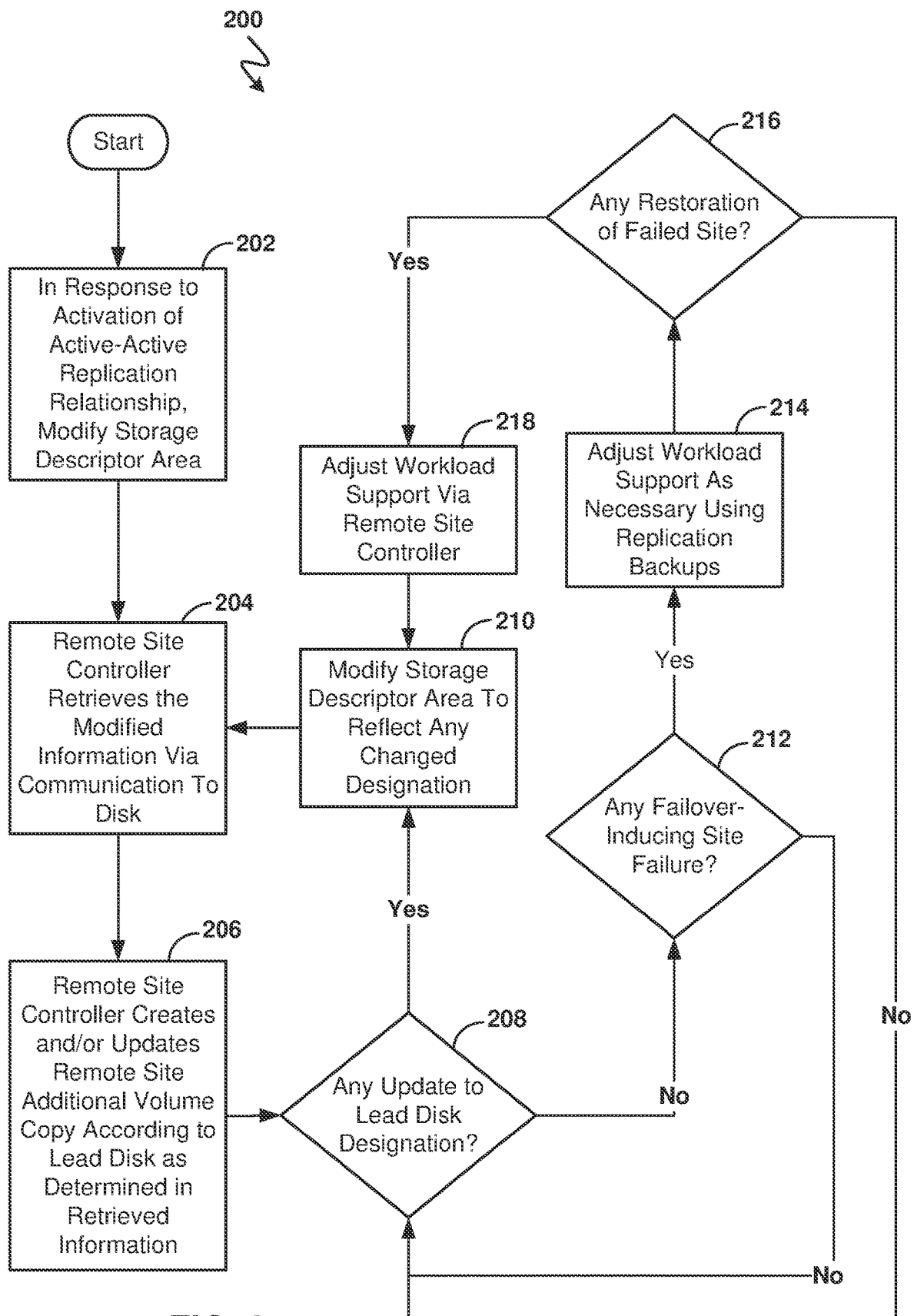
FIG. 2 is an operational flowchart illustrating a process of integrating mirrored active-active storage to a remote site according to at least one embodiment.

Referring now to FIG. 2, an operational flowchart depicts an integration process 200 that may, according to at least one embodiment, be performed using the enhanced replication system architecture 100 shown in FIG. 1. Various modules, user interfaces, and services, and data storage may be used to perform the integration process 200.

In a step 202 of the integration process 200, the storage descriptor area is modified in response to the active-active relationship being activated. This modification may include setting one or more bits to indicate enablement of the active-active replication relationship and also to indicate which of the disks is the lead disk in the active-active replication relationship. The details of the mirrored active-active storage relationship may be stored in the storage level descriptor area on the disks of the mirrored volumes.

For example, when in the enhanced replication system architecture 100 shown in FIG. 1 an active-active replication relationship is activated to support a workload running on the first virtual machine 104, in some embodiments the first site disks 108a are designated as lead disks and the second site disks 108b are designated as backup disks. Thus, when the workload/application runs on the first virtual machine 104, a volume copy is started and updated in the first site disks 108a. A backup copy of that volume copy is started and updated in the second site disks 108b. A transmission on a communication network from the first site 102a to the second site 102b is used to transmit instructions for starting and/or updating the backup volume copy in the second site disks 108b.

A kernel extension for the active-active program may be disposed on the first disk controller 106a in order to set these informational bits in the storage level descriptor area on the first site disks 108a. Another kernel extension for the active-active program may be disposed on the third disk controller 106c in order to set these informational bits in the storage level descriptor area on the second site disks 108b. Setting of the bits will be described in more detail below with regard to FIG. 3.

A similar bit setting may occur if the second disk controller 106b were being used to support a workload on another virtual machine at the first site 102a, with the first site disks 108a also being used as lead disks for storing a volume copy of data for a workload being ran by this other virtual machine. As with the previous example, the second site disks 108b may also be used as backup disks in an active-active replication relationship with the first volume copy at the first site 102a that is being controlled via the second disk controller 106b.

Another bit setting may occur if the third disk controller 106c were being used to support a workload on another virtual machine at the second site 102b, with the second site disks 108b being used as lead disks for storing a volume copy of data for a workload being ran by this other virtual machine. The first site disks 108a may in this embodiment be used as backup disks in an active-active replication relationship with the first volume copy at the second site 102b that is being controlled via the third disk controller 106c.

Step 202 may occur via an operating system path control module in a respective disk controller initiating an SCSI inquiry command to the associated storage disk and by listening for unit attentions. When a data transmission path is selected out of the two data storages, the path control module may set the bits in the storage level descriptor area. The bits indicate that the disk is part of an active-active replication relationship and whether this disk is the active (lead) disk or not. This inquiry command from the path control module may be an in band communication, e.g., a communication that accompanies or is part of regular data transfers.

In a step 204 of the integration process 200, the remote site controller retrieves the modified information via a communication to the disk. The remote site controller may use an application programming interface to retrieve the disk relationship and the enablement state that were stored in step 202. This retrieval may occur via an out-of-band communication to one or more of the disks of the mirrored volumes. The out-of-band communication to the one or more disks in some embodiments occurs via a communication through the respective disk controller of those disks. The out-of-band communication may refer to a control message.

For example, in the enhanced replication system architecture 100 shown in FIG. 1 in some embodiments the remote site controller 110 sends an application programming interface to one or more of the disk controllers, e.g., as FIG. 1 shows with the arrow to the third disk controller 106c. Similar application programming interface inquiries may additionally and/or alternatively be sent from the remote site controller 110 to the first disk controllers 106*a* and/or to the second disk controller 106*b*.

The modified information that is retrieved may include an indicator that the active-active replication status is enabled and which of the disks is hosting the lead copy of the volume for supporting a workload.

In embodiments in which the storage level descriptor area is set to indicate the active-active information at both the primary volume copy-hosting disks and the backup volume copy-hosting disks, the inquiry here as part of step 204 may be sent to one or both of the two disks/two disk controllers. The remote site controller 110 may in some embodiments send a first inquiry to a first controller/disk and then send a second inquiry to a second controller/disk in order to confirm the information retrieved in the first inquiry.

In some embodiments, the remote site controller will send a first inquiry to request information if the active-active relationship is currently activated, and then if the first inquiry is affirmative (that active-active is activated) will send a second inquiry to learn which of the disks is the lead disk. The information set in step 202 may include these two different bits of information in different bytes, so that the two-step (first asking for enablement and second asking which is the lead disk) inquiry may be applied in some instances.

In a step 206 of the integration process 200, the remote site controller creates and/or updates a remote site additional volume copy according to the lead disk as determined in the retrieved information. This additional volume copy may be established as an asynchronous copy and in an active-passive replication relationship with respect to the primary volume copy at the lead disk.

For example, in the enhanced replication system architecture 100 shown in FIG. 1 in some embodiments the remote site controller 110 sends instructions to the further remote replication site 112 and/or either to the first site 102*a* or the second site 102*b* (whichever hosts the disks that are currently designated as the lead disks in the active-active replication relationship) so that an additional volume copy will be started, updated, and/or populated in the disaster recovery disks 114 at the further remote replication site 112. The data of the volume copy and/or updates to same may be transmitted via a communication network between the site hosting the lead disks and the further remote replication site 112.

In a step 208 of the integration process 200, a determination is made as to whether any update to the lead disk designation has occurred. In response to the determination of step 208 being affirmative in that an update to the lead disk designation has occurred, the integration process 200 proceeds to step 210. In response to the determination of step 208 being negative in that an update to the lead disk designation has not occurred, the integration process 200 proceeds to step 212.

The determination of step 208 may occur via the path control module of the respective disk controller listening for unit attentions to the disks involved in the active-active relationship. The listening may occur continually and/or intermittently, e.g., on a scheduled basis with a uniform period of time between listening sessions.

In a step 210 of the integration process 200, the storage descriptor area is modified to reflect any changed designation. In some embodiments a kernel extension for the active-active relationship and in the respective disk controller may be used to update the descriptor area as the active-active state and/or relationship change. After the path control module receives a response with changed information, the path control module may notify the kernel extension which causes the kernel extension to update the bits in the storage level descriptor area. In some embodiments, the respective disk controller may send a notification signal to the remote site controller 110 in response to any change in the active-active information, e.g., bits, is made.

For the first example described above with respect to the enhanced replication system architecture 100 shown in FIG. 1, with an active-active replication relationship to support a workload running on the first virtual machine 104, with the first site disks 108*a* designated as lead disks, and with the second site disks 108*b* designated as backup disks, if some issue causes the backup disks to become the lead disks the information in the storage level descriptor area is updated. Specifically, the information may be updated to indicate that the second site disks 108*b* are now the lead disks and that the first site disks 108*a* are the backup disks in the active-active relationship. Changing of the bits will be described in more detail below with regard to FIG. 3.

After step 210, the integration process 200 returns to step 204 for a repeat of the above-described steps 204, 206, and 208 in the integration process. Because a goal of the embodiments is to provide high-availability data storage for the workload operating on the virtual machine, the integration process 200 is set up with repeated loops so that the data will continually be available, whether provided by the original primary disks, by the active-active backup disks, or by the further remote (active-passive backup) disks.

In a step 212 of the integration process 200 which occurs after no lead disk designation being identified in step 208, a determination is made as to whether any failover-inducing site failure has occurred. In response to the determination of step 212 being affirmative in that a failover-inducing site failure has occurred, the integration process 200 proceeds to step 214. In response to the determination of step 212 being negative in that a failover-inducing site failure has not occurred, the integration process 200 returns to step 208 for a repeat of step 208. The disk controllers and/or the virtual machines may initiate failover procedure if one of the supporting disks becomes unresponsive, unavailable, or otherwise damaged.

In a step 214 of the integration process 200, the workload support is adjusted as necessary using replication backups. If the active-active relationship is activated, as a first attempt failover will occur to the backup copy of the active-active relationship. For example, in the first example described with respect to FIG. 1 if the first site disks 108*a* become unavailable then support for the operations of the workload on the first virtual machine may be shifted to the second site disks 108*b* which already have a full or substantial copy of the volume copy. In another example where the second site disks 108*b* were the lead disks but became unavailable, the first site disks 108*a* may then be used as the primary support options for supporting the workload at one of the virtual machines. If in another example the first and the second site disks 108*a*, 108*b* both become unavailable, then support for the operations of the workload may be transferred to the disaster recovery disks 114 at the further remote replication site 112.

In a step 216 of the integration process 200, a determination is made as to whether the failed site has been restored. In response to the determination of step 216 being affirmative in that the failed site has been restored, the integration process 200 proceeds to step 218. In response to the determination of step 212 being negative in that the failed site has not been restored, the integration process 200 returns to step 208 for a repeat of step 208.

In a step 218 of the integration process 200, the workload support is adjusted via the remote site controller. This step 218 may include a fall back to the original production site after recovery of the original production site. The remote site controller 110 and/or one of the disk controllers may track the last queried storage relationship and states. The remote site controller 110 may determine the production site storage health and the ability to fall back. Fallback from the further remote replication site 112 may occur even if not all mirrored disks are available, for example if the first site disks 108a are restored but not the second site disks 108b or vice-versa if the second site disks 108b are restored but not the first site disks 108a. Thus, in these instances support for the application operation at one of the two main sites may be reestablished despite the active-active replication relationship not yet being reestablished.

After step 218, the integration process 200 returns to step 210 for a repeat of the above-described steps 210, 204, 206, and 208 in the integration process. Because a goal of the embodiments is to enhance high-availability data storage for the workload operating on the virtual machine, the integration process 200 is set up with repeated loops so that the data will continually be available, whether provided by the original primary disks, by the active-active backup disks, or by the further remote (active-passive backup) disks.

It may be appreciated that FIG. 2 provides an illustration of some embodiments and does not imply any limitations with regard to how different embodiments may be implemented. Many modifications to the depicted embodiment(s), e.g., to a depicted sequence of steps, may be made based on design and implementation requirements. Steps and features from the various processes may be combined into the other processes that are described in other drawings or embodiments.

FIG. 3 is a diagram illustrating a storage descriptor area for the replication integration according to at least one embodiment. FIG. 3 shows a first storage descriptor area 300 which includes a byte 14 which indicates with one of its suborder commands, e.g., with its suborder command 0x67, that this disk is currently in an active-active replication relationship. The first storage descriptor area 300 also includes in its byte 11 an indication as to whether this disk is a lead disk or a backup disk in the active-active replication relationship. The path control module of a disk controller may initiate an SCSI command with an operations code 0xED and with a new suborder command such as 0x67 in order to set the bits in response to an active-active replication relationship being started and/or altered. This first storage descriptor area 300 may be stored in the first site disks 108a or in the second site disks 108b. A second similar storage descriptor area may be stored in the other of these two storage disks. However, if the first storage descriptor area 300 indicates with byte 11 that these corresponding disks are the lead disks, the second similar storage descriptor area would indicate with its byte 11 that its corresponding disks are currently the backup disks in the active-active configuration.

Retrieval of the bits may occur via a command such as a dscli command that includes a request to the disk storage. The command may use an out of band extend communication to retrieve details, such as the information of bytes 11 and 14, of active storage from the disk storage. The remote site controller 110 already has access to the storage disks via the network and has the ability to issue commands such as the dscli commands. The dscli command may include a command line interface which receives commands in the form of text. The remote site controller 110 may issue query commands on periodic intervals and may store information locally.

With the embodiments described herein, if a production site virtual machine or host of the active-active group goes down, the applications on the virtual machine or host may continue after the virtual machine is restarted at the disaster recovery site. The present embodiments bring more transparency to active-active relationships by indicating which disks are currently the lead disks and/or which are currently the backup disks. At the level of the virtual input/output server, different disks being returned as part of the active-active relationship may trigger the request for the output of the inquiry commands. Both first storage disks and second storage disks that are currently used by the virtual machine will have corresponding replicated disks in the remote active-passive storage.

Figure 4:
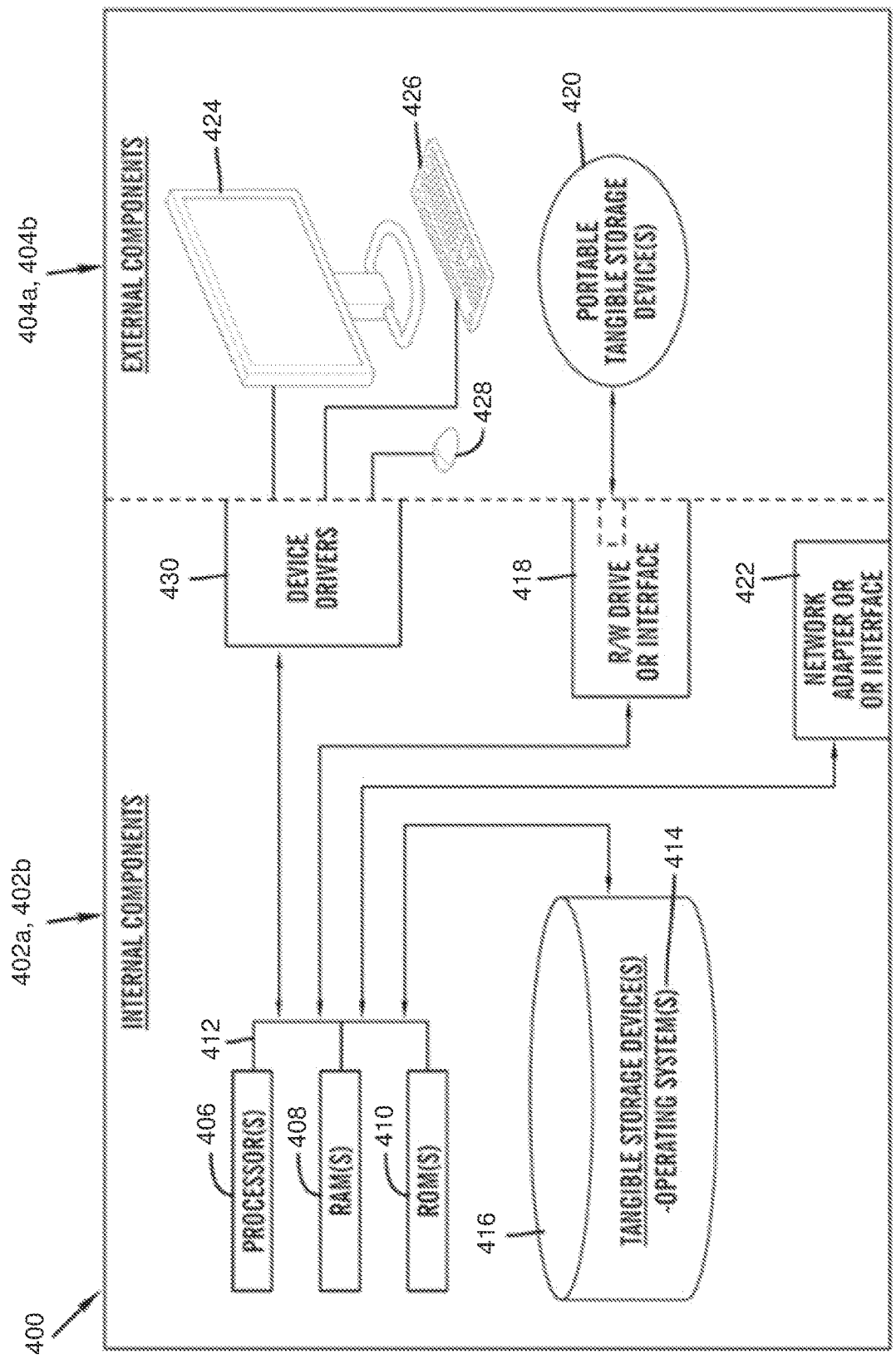
FIG. 4 is a block diagram of internal and external components of computers and servers depicted in FIG. 1 according to at least one embodiment.

FIG. 4 is a block diagram 400 of internal and external components of computers that may be used in the environment of FIG. 1 or otherwise used in the above-described integration process 200 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 402a, 402b, 404a, 404b is representative of any electronic device capable of executing machine-readable program instructions. Data processing system 402a, 402b, 404a, 404b may be representative of a smart phone, a computer system, PDA, or other electronic devices. Examples of computing systems, environments, and/or configurations that may represented by data processing system 402a, 402b, 404a, 404b include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Computers which engage with the virtual machines, e.g., with the first virtual machine 104, which operate the workload and/or other computers involved in the remote replication at the first site 102a, at the second site 102b, and at the further remote replication site 112a, and a computer operating the remote site controller 110 may include respective sets of internal components 402a, 402b and/or external components 404a, 404b illustrated in FIG. 4. Each of the sets of internal components 402a, 402b includes one or more processors 406, one or more computer-readable RAMs 408 and one or more computer-readable ROMs 410 on one or more buses 412, and one or more operating systems 414 and one or more computer-readable tangible storage devices 416. A program for controlling the remote site controller 110 and one or more of the disk controllers may be stored on one or more computer-readable tangible storage devices 416 for execution by one or more processors 406 via one or more RAMs 408 (which typically include cache memory). In the embodiment illustrated in FIG. 4, each of the computer-readable tangible storage devices 416 is a magnetic disk storage device of an internal hard drive. Alternatively, each of the computer-readable tangible storage devices 416 is a semiconductor storage device such as ROM 410, EPROM, flash memory, or any other computer-readable tangible storage device that can store a computer program and digital information.

Each set of internal components 402a, 402b also includes a R/W drive or interface 418 to read from and write to one or more portable computer-readable tangible storage devices 420 such as a CD-ROM, DVD, memory stick, magnetic tape, magnetic disk, optical disk or semiconductor storage device. A software program such as one implemented via the remote site controller 110 and/or via one or more of the disk controllers, can be stored on one or more of the respective portable computer-readable tangible storage devices 420, read via the respective R/W drive or interface 418 and loaded into the respective hard drive, e.g., the tangible storage device 416.

Each set of internal components 402a, 402b may also include network adapters (or switch port cards) or interfaces 422 such as a TCP/IP adapter cards, wireless wi-fi interface cards, or 3G, 4G, or 5G wireless interface cards or other wired or wireless communication links. The program for the remote site controller 110 and/or for one or more of the other disk controllers may be downloaded from an external computer (e.g., server) via a network (for example, the Internet, a local area network or other, wide area network) and respective network adapters or interfaces 422. From the network adapters (or switch port adaptors) or interfaces 422, the program for the remote site controller 110 may be loaded into the respective hard drive, e.g., the tangible storage device 416. The network may include copper wires, optical fibers, wireless transmission, routers, firewalls, switches, gateway computers and/or edge servers.

Each of the sets of external components 404a, 404b may include a computer display monitor 424, a keyboard 426, and a computer mouse 428. External components 404a, 404b can also include touch screens, virtual keyboards, touch pads, pointing devices, and other human interface devices. Each of the sets of internal components 402a, 402b also includes device drivers 430 to interface to computer display monitor 424, keyboard 426, and computer mouse 428. The device drivers 430, R/W drive or interface 418 and network adapter or interface 422 include hardware and software (stored in storage device 416 and/or ROM 410).

The present invention may be a system, a method, and/or a computer program product at any possible technical detail level of integration. The computer program product may include a computer readable storage medium (or media) having computer readable program instructions thereon for causing a processor to carry out aspects of the present invention The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
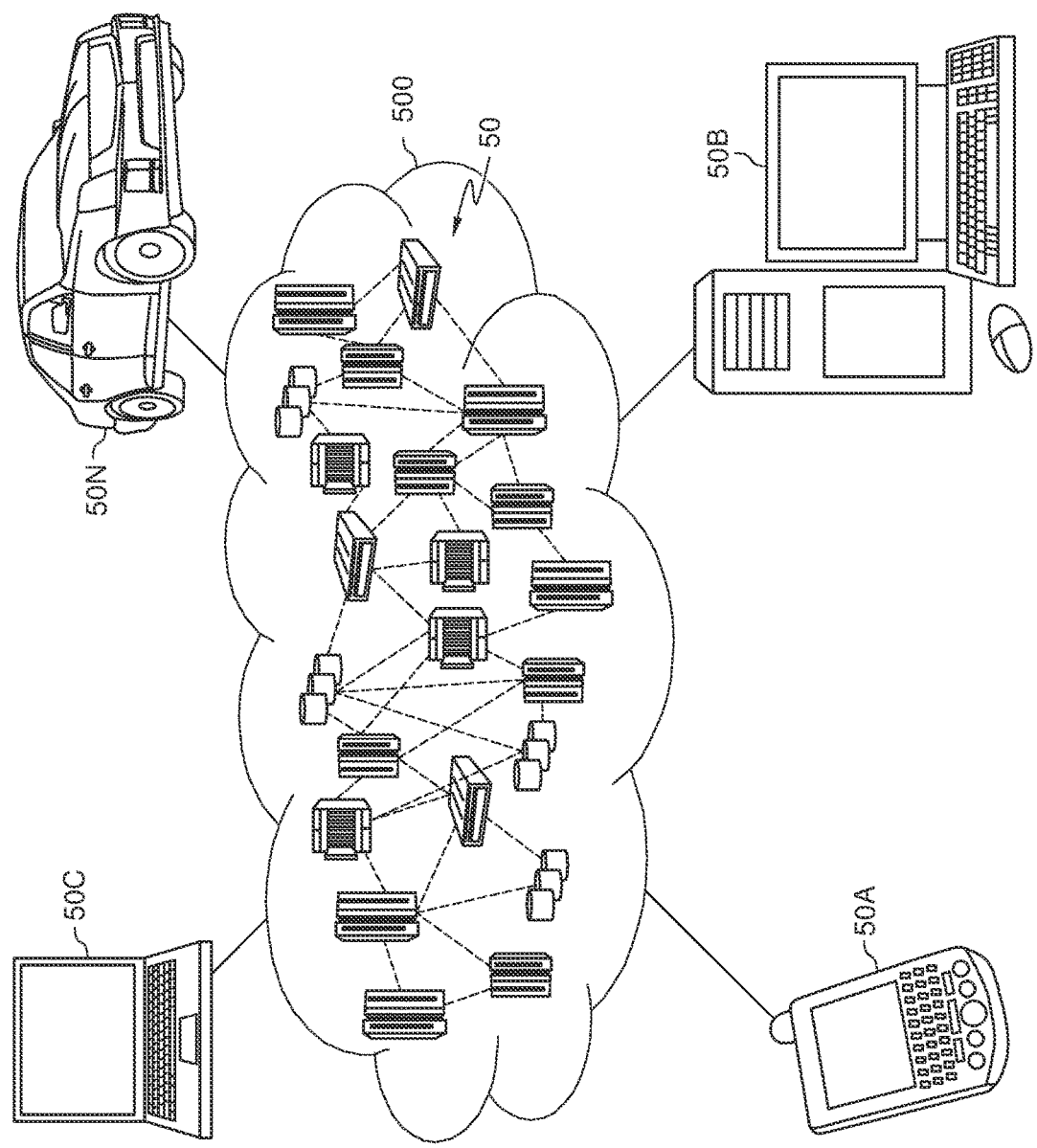
FIG. 5 is a block diagram of an illustrative cloud computing environment including the computers depicted in FIGS. 1 and 4 in accordance with an embodiment of the present disclosure.

Referring now to FIG. 5, illustrative cloud computing environment 500 is depicted. As shown, cloud computing environment 500 comprises one or more cloud computing nodes 50 with which local computing devices used by cloud consumers, such as, for example, personal digital assistant (PDA) or cellular telephone 50A, desktop computer 50B, laptop computer 50C, and/or automobile computer system 50N may communicate. Nodes 50 may communicate with one another and may include individual computers used to access data in the cloud. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 50A-N shown in FIG. 5 are intended to be illustrative only and that computing nodes 50 and cloud computing environment 500 can communicate with any type of computerized device over any type of network and/or network addressable connection (e.g., using a web browser).

Figure 6:
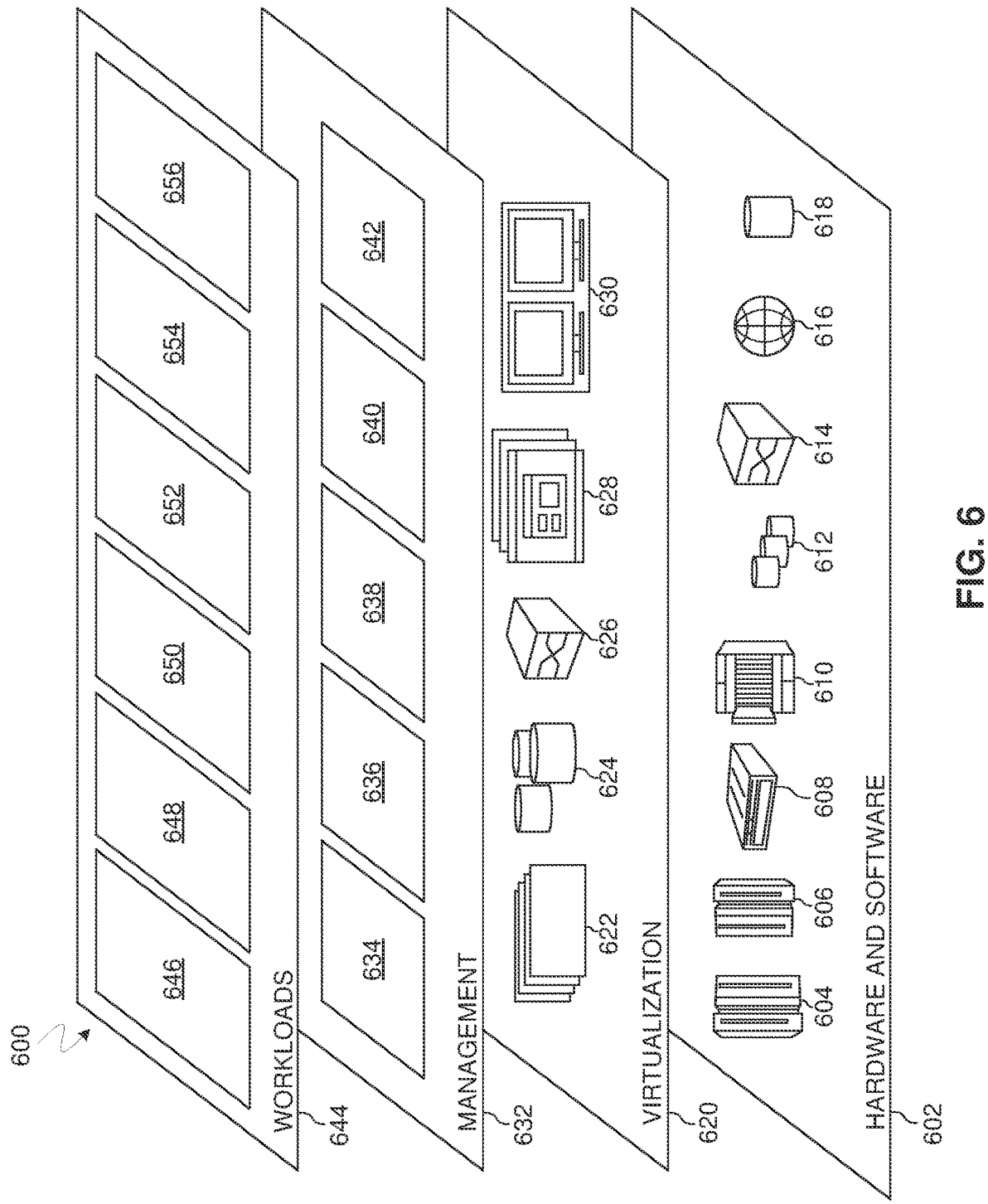
FIG. 6 is a block diagram of functional layers of the illustrative cloud computing environment of FIG. 5, in accordance with an embodiment of the present disclosure.

Referring now to FIG. 6, a set of functional abstraction layers 600 provided by cloud computing environment 500 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 602 includes hardware and software components. Examples of hardware components include: mainframes 604; RISC (Reduced Instruction Set Computer) architecture based servers 606; servers 608; blade servers 610; storage devices 612; and networks and networking components 614. In some embodiments, software components include network application server software 616 and database software 618.

Virtualization layer 620 provides an abstraction layer from which the following examples of virtual entities may be provided: virtual servers 622; virtual storage 624; virtual networks 626, including virtual private networks; virtual applications and operating systems 628; and virtual clients 630.

In one example, management layer 632 may provide the functions described below. Resource provisioning 634 provides dynamic procurement of computing resources and other resources that are utilized to perform tasks within the cloud computing environment. Metering and Pricing 636 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 638 provides access to the cloud computing environment for consumers and system administrators. Service level management 640 provides cloud computing resource allocation and management such that required service levels are met. Service Level Agreement (SLA) planning and fulfillment 642 provide pre-arrangement for, and procurement of, cloud computing resources for which a future requirement is anticipated in accordance with an SLA.

Workloads layer 644 provides examples of functionality for which the cloud computing environment may be utilized. Examples of workloads and functions which may be provided from this layer include: mapping and navigation 646; software development and lifecycle management 648; virtual classroom education delivery 650; data analytics processing 652; transaction processing 654; and replication system integration 656. The integration of the active-active system with the active-passive system that is performed with the remote site controller 110 and/or with one or more disk controllers by updating storage level descriptor area information in the storage disks and retrieving that information provides a way to integrate these different replication systems.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   storing a volume of data in a dual-site data replication system comprising a first site and a second site, the first site comprising a first disk and the second site comprising a second disk, the dual-site data replication system providing active-active access to the volume of data stored in one of the first disk or the second disk that is designated as an active disk for the active-active access and replicated in the other of the first disk and the second disk that is designated as a backup disk for the active-active access;
   swapping designations of the active disk and the backup disk between the first disk at the first site and the second disk at the second site in response to detection of a condition;
   in response to the swapping, updating, in a storage descriptor area of the first disk or of the second disk, at least one indicator that indicates whether the first disk is designated as the active disk or as the backup disk for the active-active access;
   transmitting, via a computer, a query command to access the updated storage descriptor area;
   receiving, via the computer, a response to the query command, the response comprising a current designation of the active disk and the backup disk for the dual-site data replication system and being generated in response to checking the at least one updated indicator; and in response to the receiving the response to the query command, controlling, via the computer, an additional copy of the volume of data at a third site, wherein the controlling is based on the active disk as determined by the current designation in the response.

2. The method of claim 1, wherein the transmitting occurs as an out of band communication to the first disk.

3. The method of claim 1, further comprising:
shifting a workload to the additional copy of the volume at the third site in response to a failure of the dual-site data replication system.

4. The method of claim 3, further comprising:
upon restoration of the dual-site data replication system, returning the workload to the dual-site data replication system.

5. The method of claim 4, wherein the restoration of the dual-site data replication system occurs for only the first disk hosting the volume of data and not for the second disk of the dual-site data replication system.

6. The method of claim 1, wherein the at least one indicator includes a custom state bit and the response to the query command is based on the custom state bit.

7. A computer system comprising:
one or more processors, one or more computer-readable memories, one or more computer-readable tangible storage media, and program instructions stored on at least one of the one or more computer-readable tangible storage media for execution by at least one of the one or more processors to cause the computer system to:
store a volume of data in a dual-site data replication system comprising a first site and a second site, the first site comprising a first disk and the second site comprising a second disk, the dual-site data replication system providing active-active access to the volume of data stored in one of the first disk or the second disk that is designated as an active disk for the active-active access and replicated in the other of the first disk and the second disk that is designated as a backup disk for the active-active access;
swap designations of the active disk and the backup disk between the first disk at the first site and the second disk at the second site in response to detection of a condition;
in response to the swapping, update in a storage descriptor area of the first disk or of the second disk at least one indicator that indicates whether the first disk is designated as the active disk or as the backup disk for the active-active access;
transmit a query command to access the updated storage descriptor area;
receive a response to the query command, the response comprising a current designation of the active disk and the backup disk for the dual-site data replication system and being generated in response to checking the at least one updated indicator; and
in response to the receiving the response to the query command, control an additional copy of the volume of data at a third site, wherein the controlling is based on the active disk as determined by the current designation in the response.

8. The computer system of claim 7, wherein the transmitting occurs as an out of band communication to the first disk.

9. The computer system of claim 7, wherein the program instructions are further for execution to cause the computer system to:
shift a workload to the additional copy of the volume at the third site in response to a failure of the dual-site data replication system.

10. The computer system of claim 9, wherein the program instructions are further for execution to cause the computer system to:
upon restoration of the dual-site data replication system, return the workload to the dual-site data replication system.

11. The computer system of claim 10, wherein the restoration of the dual-site data replication system occurs for only the first disk hosting the volume of data and not for the second disk of the dual-site data replication system.

12. The computer system of claim 7, wherein the at least one indicator includes a custom state bit and the response to the query command is based on the custom state bit.

13. A computer program product comprising a computer-readable storage medium having program instructions embodied therewith, wherein the program instructions are executable by a computer system to cause the computer system to:
store a volume of data in a dual-site data replication system comprising a first site and a second site, the first site comprising a first disk and the second site comprising a second disk, the dual-site data replication system providing active-active access to the volume of data stored in one of the first disk or the second disk that is designated as an active disk for the active-active access and replicated in the other of the first disk and the second disk that is designated as a backup disk for the active-active access;
swap designations of the active disk and the backup disk between the first disk at the first site and the second disk at the second site in response to detection of a condition;
in response to the swapping, update in a storage descriptor area of the first disk or the second disk at least one indicator that indicates whether the first disk is designated as the active disk or as the backup disk for the active-active access;
transmit a query command to access the updated storage descriptor area;
receive a response to the query command, the response comprising a current designation of the active disk and the backup disk for the dual-site data replication system; and
in response to the receiving the response to the query command, control an additional copy of the volume of data at a third site, wherein the controlling is based on the active disk as determined by the current designation in the response.

14. The computer program product of claim 13, wherein the transmitting occurs as an out of band communication to the first disk.

15. The computer program product of claim 13, wherein the program instructions are further for execution to cause the computer system to:
shift a workload to the additional copy of the volume at the third site in response to a failure of the dual-site data replication system.

16. The computer program product of claim 15, wherein the program instructions are further for execution to cause the computer system to:
upon restoration of the dual-site data replication system, return the workload to the dual-site data replication system.

17. The computer program product of claim 16, wherein the restoration of the dual-site data replication system occurs for only the first disk hosting the volume of data and not for the second disk of the dual-site data replication system.

18. The computer program product of claim 13, wherein the at least one indicator includes a custom state bit and the response to the query command is based on the custom state bit.

19. The method of claim 1, wherein the storage descriptor area further comprises a second indicator indicating that the active-active access is enabled.

20. The computer system of claim 7, wherein the storage descriptor area further comprises a second indicator indicating that the active-active access is enabled.

\* \* \* \* \*